United States Patent [19]

Taylor

[11] Patent Number: 4,749,047

[45] Date of Patent: Jun. 7, 1988

[54] ANNULAR WELLHEAD SEAL

[75] Inventor: William M. Taylor, Houston, Tex.

[73] Assignee: Cameron Iron Works USA, Inc., Houston, Tex.

[21] Appl. No.: 44,581

[22] Filed: Apr. 30, 1987

[51] Int. Cl.$^4$ .............................................. E21B 33/03
[52] U.S. Cl. .................... 166/382; 166/182; 166/208; 166/212; 166/217; 166/387; 285/382.5
[58] Field of Search ............... 166/379, 380, 387, 382, 166/206–208, 212, 217, 195, 179, 182, 115, 85, 88; 277/236, 117, 118, 116.2, 116.4, 116.6, 116.8, 115, 190, 191, 214; 29/523; 285/382.5, 382.4, 382.2, 382.1, 382, 139–143

[56] References Cited

U.S. PATENT DOCUMENTS

| | | | |
|---|---|---|---|
| 48,599 | 7/1865 | Swartz | 277/116.6 |
| 2,134,311 | 10/1938 | Minor et al. | 285/382 X |
| 3,924,678 | 12/1975 | Ahlstone | 166/208 X |
| 4,131,287 | 12/1978 | Gundemon et al. | 277/191 |
| 4,368,571 | 1/1983 | Cooper, Jr. | 29/523 X |
| 4,646,845 | 3/1987 | Boeker | 166/88 |
| 4,662,663 | 5/1987 | Schmitz | 285/382.5 |
| 4,665,979 | 5/1987 | Boehm, Jr. | 166/217 X |

FOREIGN PATENT DOCUMENTS 620892 11/1962 Belgium .............................. 277/236

Primary Examiner—George A. Suchfield
Assistant Examiner—Hoang C. Dang
Attorney, Agent, or Firm—Vinson & Elkins

[57] ABSTRACT

An improved wellhead structure including a wellhead housing having a sealing surface with grooves therein and pressure compensating material in the grooves, a sealing sleeve having inner and outer resilient seal rings and an internal actuating groove with upper and lower shoulders, an actuating ring having an outer flange engaged within the internal groove in the sleeve and an external surface tapering downward and inwardly and a hanger with an upstanding rim having external grooves with pressure compensating material in the grooves and having an inner surface which tapers upwardly and outwardly and is engaged by the external tapered surface of the actuating ring and upper and lower external seals and a port extending from the interior of the actuating ring to its exterior into the area between such seals so that pressure applied through the port forges the hanger rim and the sealing sleeve outward to ensure positive metal-to-metal sealing across the annulus between the exterior of the hanger rim and the interior of the wellhead housing.

14 Claims, 5 Drawing Sheets

ANNULAR WELLHEAD SEAL

BACKGROUND

The present invention relates to an improved wellhead seal for sealing across the annulus between the interior of a wellhead housing and the exterior of a hanger positioned within the wellhead housing.

Prior wellhead seals have included resilient seals which are actuated into sealing position by axial force exerted on the seal ring as shown in U.S. Pat. No. 3,492,026.

Other wellhead seals have included resilient material with metal end members having lips which when the seal is set engage the sealing surfaces to prevent the extrusion of the resilient material and also provide a metal-to-metal metal sealing engagement as shown in U.S. Pat. No. 4,496,162.

Some annular wellhead seals have wedging elements to wedge the legs of the seal ring into sealing engagement with their sealing surfaces. U.S. Pat. Nos. 4,131,287 and 4,595,053 disclose such structure and the '053 patent discloses the use of wickers or small parallel grooves into which the seal is forced for sealing.

Further, it has been known to form tubular members into fittings so that they are secured and in sealing engagement with the interior of their fittings. This art is best shown in the U.S. Pat. Nos. 1,905,122; 2,438,529; 2,477,676; 3,432,916; 4,330,144; 4,388,752 and 4,593,448. U.S. Pat. No. 4,593,448 discloses the use of a collapsible material in the grooves to avoid having liquid in the grooves which would prevent the desired forming of the tubular member into both sealing and locking engagement with the exterior fitting.

SUMMARY

The present invention is directed to an improved annular wellhead seal which includes a wellhead housing having a sealing surface with grooves therein and pressure compensating material in the grooves, a sealing sleeve having an internal actuating groove with upper and lower shoulders, an actuating ring having an outer flange engaged within the internal groove in the sleeve and a hanger with an upstanding rim having external grooves with pressure compensating material in the grooves and having an inner surface which tapers upwardly and outwardly and is engaged by the external surface of the actuating ring, which has a mating tapered surface and upper and lower external seal and a port extending from the interior of the actuating ring to its exterior into the area between such seals so that pressure applied through the port forges the hanger rim and the sealing sleeve outward to ensure positive metal-to-metal sealing across the annulus between the exterior of the hanger rim and the interior of the wellhead housing. The seal ring may also include inner and outer resilient seal rings.

An object of the present invention is to provide an improved annular wellhead seal which is cold forged into sealing engagement.

Another object is to provide an improved annular wellhead seal which even though yieldably formed into sealing engagement can be released and recovered from the well bore.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
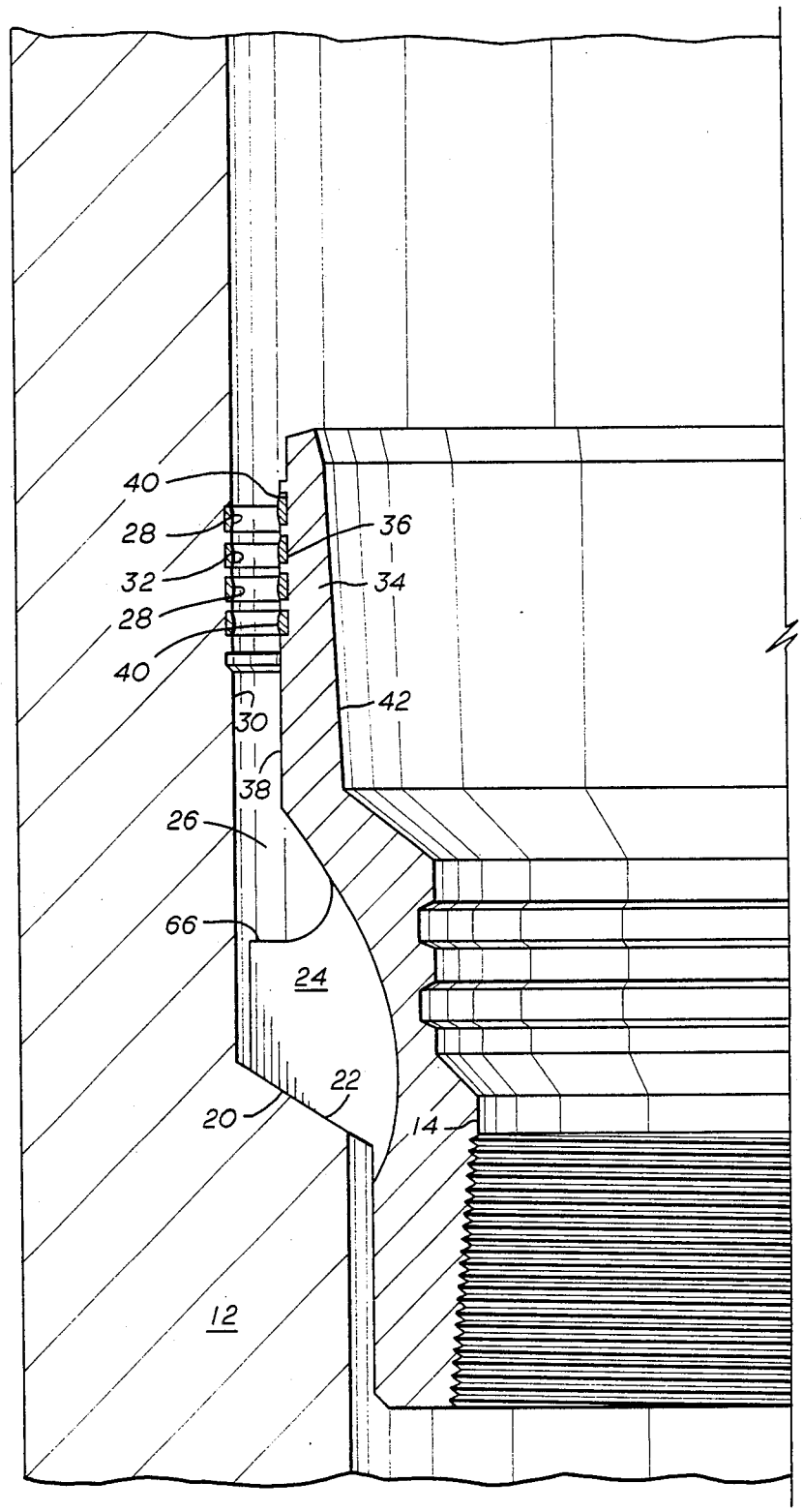
FIG. 1 is a sectional view of a wellhead with the hanger landed on the wellhead housing seat.
Figure 2:
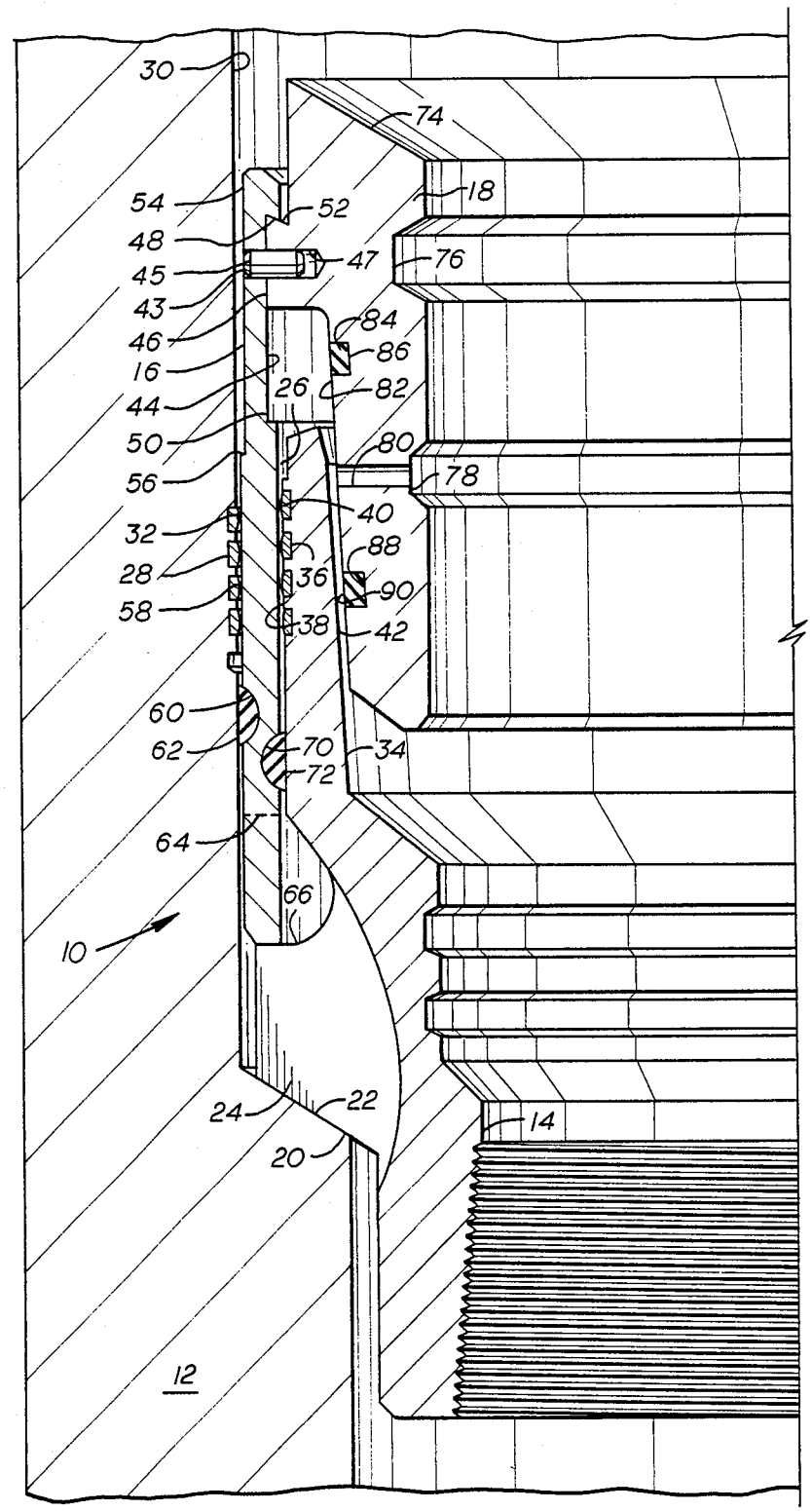
FIG. 2 is another sectional view of the wellhead with the sealing sleeve and the actuating ring landed but in unset position.
Figure 3:
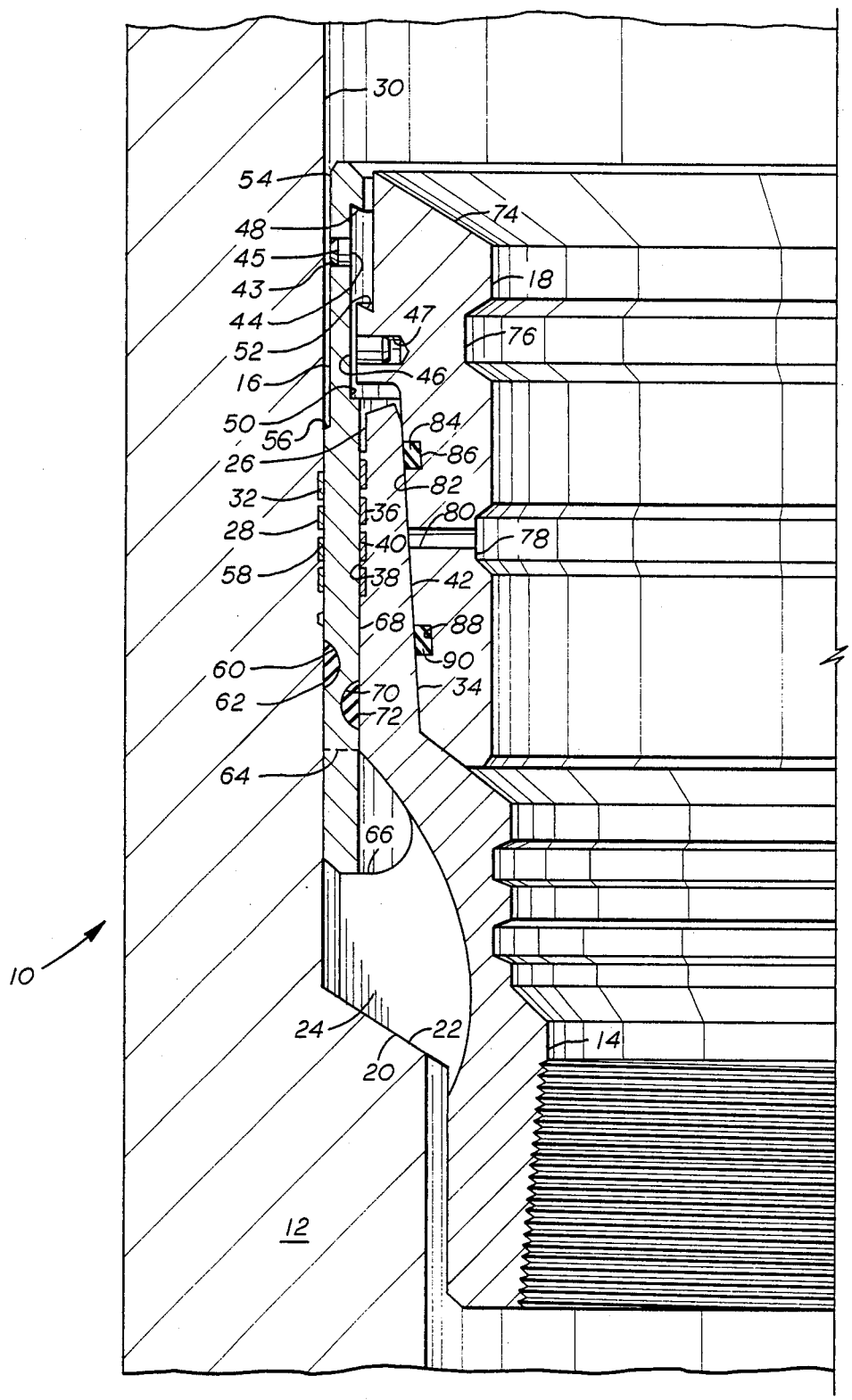
FIG. 3 is another sectional view of the wellhead with the improved sealing assembly after initial movement of the actuator ring.

As shown in FIGS. 2 and 3, wellhead assembly 10 includes wellhead housing 12, hanger 14, sealing sleeve 16 and actuating ring 18. In normal operations hanger 14 is landed with its external downwardly facing shoulder 20 in engagement with upwardly facing landing seat 22 within wellhead housing 12. Mud slots 24 extending through portions of hanger 14 as shown to allow circulation of fluids through annular space 26 between the exterior of hanger 14 and the interior of housing 12 after hanger 14 has been landed and before sealing sleeve 16 has been installed and energized.

A plurality of grooves 28 extend around the interior surface 30 of housing 12 and such grooves 28 are at least partially filled with pressure compensating material 32, such as microspheres in an epoxy matrix. Such grooves function to provide the sealing surface for sealing engagement with sealing sleeve 16 on the interior surface 30 of housing 12 as hereinafter explained. Hanger 14 includes upper rim 34 with a plurality of grooves 36 which extend around the exterior surface 38 of hanger rim 34 and such grooves 36 are at least partially filled with pressure compensating material 40, such as microspheres in an epoxy matrix. Such grooves function to provide the sealing surface for sealing engagement with sealing sleeve 16 on the exterior surface 38 of hanger 14 as hereinafter described. Inner surface 42 of hanger rim 34 is slightly tapered downwardly and inwardly as shown.

As shown in FIG. 2, sealing sleeve 16 includes inner annular groove 44 in its upper interior to receive exterior flange 46 which extends outwardly from actuating ring 18. Exterior flange 46 of actuating ring 18 has upper shoulder 52 which tapers upwardly and outwardly. Upper downwardly facing shoulder 48 marks the upper limit of groove 44 and lower upwardly facing shoulder 50 marks the lower limit of groove 44. Upper shoulder 48 tapers downwardly and inwardly to mate with upper shoulder 52 on flange 46. This mating tapered engagement simplifies the release and retrieval of actuator ring 18 and sleeve 16 from their set positions. Exterior surface 54 of sleeve 16 extends from the upper end of sleeve 16 to outward taper 56 from which surface 58 extends downward to external annular groove 60 which has resilient seal 62 positioned therein. The lower end of sleeve 16 includes slots 64 and when landed engages external upwardly facing hanger shoulder 66. Inner surface 68 of sleeve 16 below shoulder 50 extends downward to internal annular groove 70 in which resilient seal 72 is positioned. As sealing sleeve 16 is being run into the wellhead housing 12 and annular space 26, it is retained to actuating ring 18 by shear pins 45 positioned through holes 43 in sleeve 16 and into holes 47 in actuating ring 18. After sealing sleeve 16 has been landed on upwardly facing hanger shoulder 66, further downward movement of actuating ring 18 shears pins 45 and actuating ring 18 moves downward into position to allow energization of sealing sleeve 16 as will be described hereinafter.

Upper surface 74 of actuating ring 18 is tapered downwardly and inwardly to provide a landing seat for any additional wellhead member which is to be positioned within the wellhead housing 12. Groove 76 around the interior of actuating ring 18 provides a profile for engagement by a well tool (not shown) and lower groove 78 is in communication with port 80 which extends through actuating ring 18 as shown. As stated above, flange 46 extends from the upper exterior of actuating ring 18. Exterior surface 82 below flange 46 tapers downwardly and inwardly to the same degree as surface 42 on the interior of hanger rim 34. Surface 82 has upper groove 84 having seal 86 therein and lower groove 88 having seal 90 therein being respectively positioned above and below the opening of port 80 on surface 82. The positions of grooves 84 and 88 are selected to ensure a proper seal above and below port 80 against sleeve 16 while spanning at least a substantial portion of the surface 42 on hanger rim 34.

Figure 4:
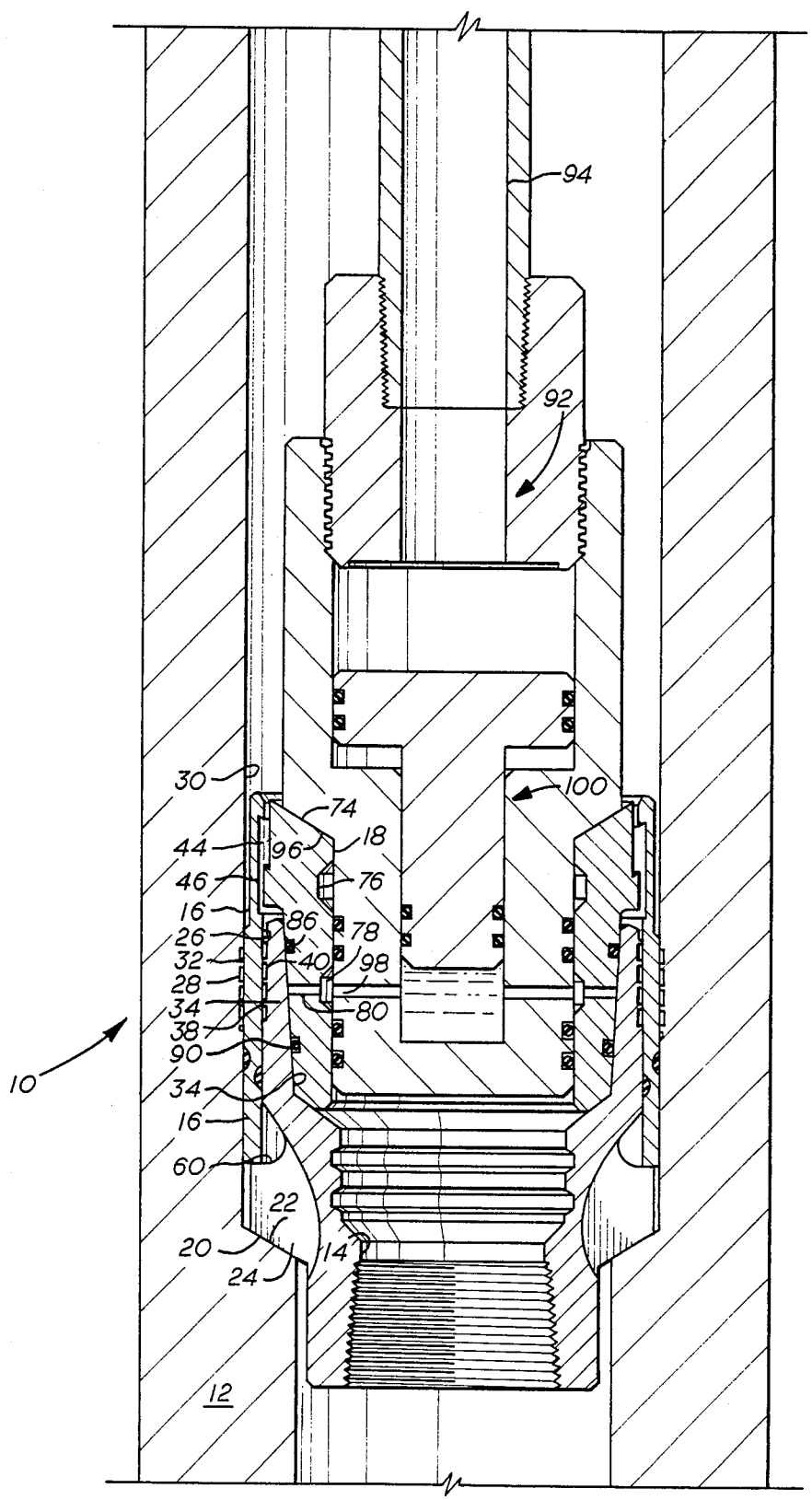
FIG. 4 is another sectional view of the wellhead with the improved sealing assembly after forming into sealing position and showing the tool by which forming pressure is delivered to the port through the actuating ring.
Figure 5:
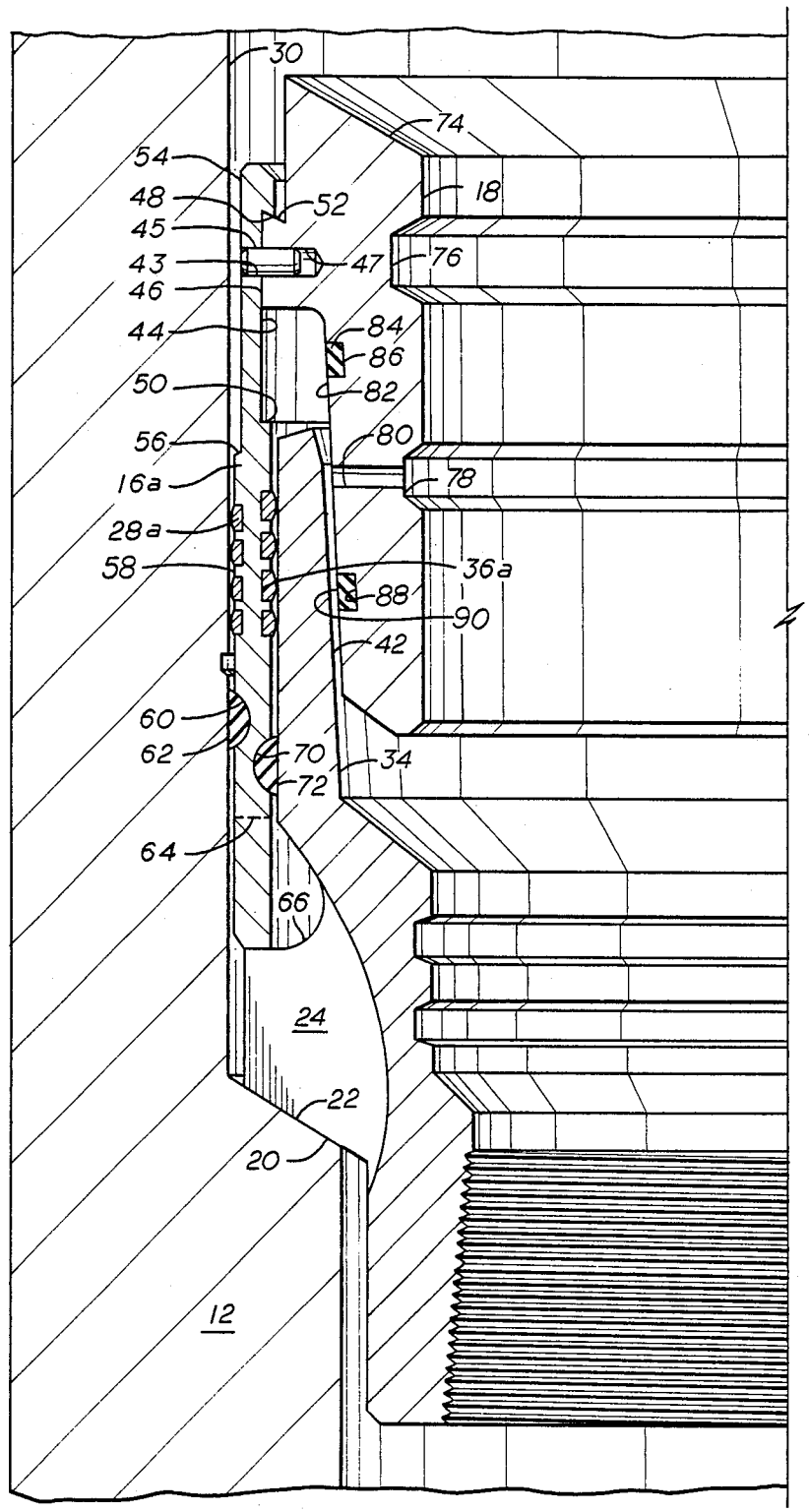
FIG. 5 is a section view of another form of invention which view is substantially the same as that shown in FIG. 2 but with the modified sealing sleeve replacing the sealing sleeve shown in FIG. 2.

When sleeve 16 and actuating ring 18 have landed, as shown in FIG. 2, operating tool 92 (FIG. 4) which is lowered on string 94 so that its shoulder 96 engages surface 74 on actuating ring 18 and forces it downwardly. Since sleeve 16 is seated on hanger shoulder 66, actuating ring 18 moves downward with respect to sleeve 16 and hanger rim 34. This downward movement brings outer surface 82 of actuating ring 18 into wedging engagement with inner surface 42 of hanger rim 34 forcing it radially outward. As actuating ring 18 continues its downward movement it moves hanger rim 34 into tight engagement with sleeve 16 and sleeve 16 into tight engagement with internal surface 30 of wellhead housing 12. Operating tool 92 also has its lower portion positioned within actuating ring 18 with port 98 communicating from the interior of tool 92 to groove 78. Tool 92 includes pressure amplifying means 100 which amplifies the fluid pressure delivered through string 94. As pressure forces are developed as hereinafter described, tool 92 continues to exert a downward force on surface 74 of actuating ring 18. Hydraulic fluid fills the lower chamber of tool 92 and is delivered through port 98, groove 78, port 80 and into the space between seals 86 and 90 so that it is exerted on the interior of hanger rim 34 and the force developed thereby is also translated to rim 34 to create substantial forces urging rim 34 against the interior of sleeve 16 and the exterior of sleeve 16 against interior surface 30 of wellhead housing 12. The forces created by the wedging action of actuating ring 18 and the pressure delivered by tool 92 are sufficient to provide a metal-to-metal gripping and sealing engagement between sleeve 16 and the surfaces of hanger rim 34 and housing 12. When the gripping and sealing step is completed, pressure in string 94 is relieved and tool 92 is retrieved, leaving the improved wellhead assembly 10 in sealed position.

The modified form of the invention shown in FIG. 7 is the same in all components as the structure previously described except that the sealing grooves 28 and 36 which are in the interior of housing 12 and the exterior of hanger 14 in the form shown in FIG. 2 have been moved to be sealing grooves 28a and 36a on the exterior and interior, respectively, of sealing sleeve 16a. With this modified form of the invention, it is advantageous since the pressure compensating material in the grooves 28 and 36 can be depleted or compressed on initial setting and its advantage lost in subsequent setting of the assembly. With the grooves and pressure compensating material in the sealing sleeve 16a, a leaking seal on initial setting allows the assembly to be recovered and a new sealing sleeve 16a to be used to provide the new seal. In this way the damage to the grooves and pressure compensating material in the grooves is avoided and the best chance for a tight gripping and sealing engagement with each running is ensured.

It should be noted that setting can be sequential with the wedging action created by the downward movement of actuating ring 18 as a first steps followed by the pressure forming step. However, it is believed to be advantageous to perform such steps simultaneously so that they are both effective and provide the maximum efficiency in the setting of the gripping and sealing engagement between sleeve 16 and the surfaces of hanger rim 34 and housing 12.

As mentioned above, actuating ring 18 and sleeve 16 can be retrieved by lowering a suitable tool (not shown) into the interior of actuating ring 18 and (through engagement with groove 76) lifting actuating ring 18. With sufficient force, actuating ring 18 moves upward and when flange shoulder 52 engages shoulder 48 on sleeve 16. The tapers on shoulders 52 and 48 with upward movement of actuating ring 18 provide an inward force component of the upward force and assist in the relieving of the gripping engagement between sleeve 16 and housing 12 and between sleeve 16 and hanger rim 34.

What is claimed is:
1. A wellhead structure comprising
   a wellhead housing having an internal landing seat and internal annular gripping and sealing grooves therein above the landing seat,
   a hanger having a landing shoulder, an upwardly facing shoulder above said landing shoulder, an upwardly extending rim with internal annular gripping and sealing grooves therein and an internal rim tapered surface,
   an annular space defined between the exterior of said hanger rim and the interior of said housing above said upwardly facing hanger shoulder when said hanger is landed on said landing seat,
   a sealing sleeve positioned within said annular space with its lower end landed upon said upwardly facing hanger shoulder, and
   an actuating ring coacting with said sealing sleeve and having an external tapered surface for engaging the interior surface of said rim, a port communicating through said actuating ring, and sealing means above and below said port between the exterior of said actuating ring and the interior of said rim.

2. A wellhead structure according to claim 1 wherein said sealing means includes an upper sealing ring in the exterior surface of said actuating ring above the opening of said port in such exterior surface and a lower sealing ring in the exterior surface of said actuating ring below the opening of said port in such exterior surface.

3. A wellhead structure according to claim 1 including resilient sealing means positioned in internal and external grooves in said sealing sleeve in the lower portion of said sealing sleeve.

4. A wellhead structure according to claim 1 including pressure compensating material at least partially filling said internal housing grooves and said external hanger rim grooves.

5. A wellhead structure according to claim 4 wherein said pressure compensating material is microspheres in an epoxy matrix.

6. A wellhead structure comprising a housing having an internal landing seat and internal annular gripping and sealing grooves therein above the landing seat, a hanger having an external landing shoulder landed on the internal housing landing seat, an upwardly facing external shoulder above said landing shoulder and an upstanding rim extending above said external shoulder and having external annular grooves and an internal surface which tapers downwardly and inwardly, a sealing sleeve positioned between the exterior of said hanger rim and the interior of said housing, an actuating ring having an outer surface tapering downwardly and inwardly and positioned against said internal tapered hanger surface, a port extending therethrough and external annular seals spaced above and below the opening of said port to the exterior of said ring, and means coacting between said sleeve and said actuating ring, movement of said actuating ring downward on said hanger rim wedging said hanger rim and said sealing sleeve outwardly and pressure supplied through said port forcing said hanger rim and said sealing sleeve radially outward for sealing the annular space between the exterior of said hanger rim and the interior of said housing.

7. A wellhead structure according to claim 1 wherein said coacting means includes an internal groove in the upper interior of said sealing sleeve said groove having a shoulder at its upper end and a flange on the exterior of said actuating ring positioned within said sealing sleeve internal groove and having an upper surface.

8. A wellhead structure according to claim 7 wherein the shoulder at the upper end of said sealing sleeve internal groove is tapered downwardly and inward, and the upper surface of said actuating ring flange is tapered downward and inward to mate with the upper groove shoulder whereby upward force exerted by said actuating ring exerted on said groove shoulder creates an inward force component ot assist in the release of said sealing sleeve from its sealing position.

9. A method of providing an annular wellhead seal between the exterior of a hanger rim and the interior of a wellhead housing including the steps of landing a sealing sleeve in the annular space between the hanger rim and the housing interior, wedging said hanger rim outward against said sealing sleeve, and exerting fluid pressure on a substantial portion of the interior of said hanger rim to pressure form said hanger rim and said sealing sleeve into sealing engagement with each other and into sealing engagement of said sealing sleeve with said housing interior.

10. The method according to claim 9 wherein said wedging and pressure exerting steps are performed sequentially.

11. The method according to claim 9 wherein said wedging and pressure exerting steps are performed simultaneously.

12. A wellhead structure comprising a wellhead housing having an internal landing seat, a hanger having a landing shoulder, an upwardly facing shoulder above said landing shoulder, an upwardly extending rim, and an internal rim tapered surface, an annular space defined between the exterior of said hanger rim and the interior of said housing above said upwardly facing hanger shoulder when said hanger is landed on said landing seat, a sealing sleeve positioned within said annular space with its lower end landed upon said upwardly facing hanger shoulder, gripping and sealing grooves in one of the interior surface of said housing and the facing exterior surface of said sealing sleeve, gripping and sealing grooves in one of the interior surface of said sealing sleeve and the exterior surface of said hanger rim, and an actuating ring coacting with said sealing sleeve and having an external tapered surface for engaging the interior surface of said rim, a port communicating through said actuating ring, and sealing means above and below said port between the exterior of said actuating ring and the interior of said rim.

13. A wellhead structure according to claim 12 wherein said gripping sealing grooves are in the interior of said housing and in the exterior of said hanger rim.

14. A wellhead structure according to claim 12 wherein said gripping and sealing grooves are in the exterior and interior of said sealing sleeve.

* * * * *